US005499792A

United States Patent [19]

Tamiso

[11] Patent Number: 5,499,792

[45] Date of Patent: Mar. 19, 1996

[54] ELECTRIC TROLLING MOTOR MOUNT

[76] Inventor: Thomas F. Tamiso, 48 Broadbrook Rd., East Windsor, Conn. 06088

[21] Appl. No.: 354,531

[22] Filed: Dec. 13, 1994

[51] Int. Cl.[6] .............................. F16M 1/00

[52] U.S. Cl. .............................. 248/643; 440/53

[58] Field of Search .............................. 248/640, 641, 248/642, 643; 440/53, 900

[56] References Cited

U.S. PATENT DOCUMENTS

| | | | |
|---|---|---|---|
| 2,042,598 | 6/1936 | Harvey | 248/642 |
| 2,068,982 | 1/1937 | Harvey | 248/641 |
| 2,212,675 | 8/1940 | Taylor | 248/641 |
| 2,213,520 | 9/1940 | Gentry | 248/642 X |
| 3,119,365 | 1/1964 | Evans | 248/642 X |
| 4,382,574 | 5/1983 | Ellestad | 248/641 |
| 4,682,960 | 7/1987 | Hendrickson | 248/640 X |
| 4,955,834 | 9/1990 | Henderson | 440/53 X |
| 5,389,017 | 2/1995 | Huzjak | 440/900 X |

*Primary Examiner*—J. Franklin Foss
*Attorney, Agent, or Firm*—Fishman, Dionne & Cantor

[57] ABSTRACT

A low cost and easily mounted and removed electric trolling motor mount with optional fixed rudder is provided comprised of a structured bar with two slidable adjustable clamp assemblies to affix the mount to the gunwales of a boat. The optional fixed rudder is provided with torsional pivot means to allow the fixed rudder to move upwardly should the fixed rudder strike an object below the hull of the boat.

26 Claims, 2 Drawing Sheets

ELECTRIC TROLLING MOTOR MOUNT

BACKGROUND OF THE INVENTION

This invention relates generally to motor mounts for Jon boats, V-hull boats, canoes or the like. More particularly, this invention relates to an electric trolling motor mount which is simple, relatively inexpensive and which mounts across the gunwales (gunned of a boat in front of the farthest forward seat.

Motor mounts for canoes and the like are well known that have a motor mounting piece for attaching an outboard motor with accompanying power shaft and propeller, whereby the motor mounting piece is supported by a framework comprising two side pieces, or bars which in the mounted or affixed position are generally situated along the gunwales, and two or more cross pieces. Such motor mounts are known for examples through U.S. Pat. Nos. 1,118,208; 2,475,889; 3,601,344; 3,645,483 and 3,918,666.

The aforementioned motor mounts are designed for relatively heavy petroleum powered outboard motors to support a motor directly sternwards. It is well known in the field that a relatively light electric powered outboard motor is more desirable and maneuverable in areas that are in close quarters or involving shallow water. The elimination of heavy weight in the transom end of a Jon boat, V-hull boat or a canoe would be highly desirable. It is also, well known that when trolling for fish, that a pulling action instead of the conventional pushing action as required by the aforementioned prior art would be desirable when using a relatively low powered electric outboard motor in extremely close quarters or shallow water. In addition, it is desirable that such a motor mount be capable of handling clamp-on rod holders for trolling with fishing poles on each side of the boat. Further, a clamped-on rudder to be mounted at the rear of the boat should be provided which is capable of providing the boat with stability but designed to pivot should it hit an object below the hull of the boat.

SUMMARY OF THE INVENTION

The above-discussed and other problems and deficiencies of the prior art are overcome or alleviated by the simple and low cost electric trolling motor mount of the present invention. In accordance with the present invention, a low cost, easily mounted and removed electric trolling motor mount with optional fixed rudder is provided which comprises a bar having two clamps that mount to the gunwales of a boat. These clamps are adjustably movable along the mounting bar to allow installation on a variety of widths of Jon boats, V-hull boats, canoes and like boats. The bar assembly is light weight and rugged and is provided with an optional fixed rudder which pivots should it strike an object below the hull bottom of the boat.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES.

Figure 2:
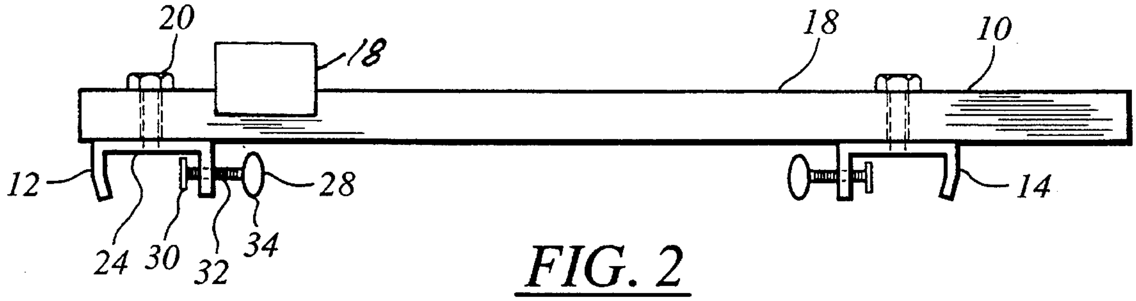
FIG. 2 is a side elevation view of an electric trolling motor mount in accordance with the present invention.

FIG. *7a–7i* are alternate cross-section of the structural member 18 of the device of FIG. 2.

DESCRIPTION OF THE PREFERRED EMBODIMENT

Figure 1:
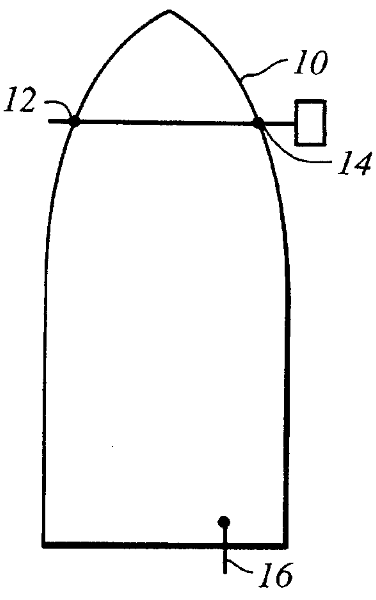
FIG. 1 is a plan view of an electric trolling motor mount installed on a boat in accordance with the present invention.

Referring first to FIG. 1, the electric trolling motor mount of the present invention is generally shown at 10. The brackets to fasten device 10 to the gunwales of a boat are shown at 12 and 14. The fixed rudder is shown generally in FIG. 1 at 16. It should be noted that device 10 is preferably mounted in front of the furthest forward seat of the boat. In this position, the electric trolling motor is easily controlled and provides the preferred pulling action. It should also be noted that the light weight of the electric trolling motor mount and electric outboard motor allows for minimal draft of the boat in water.

Figure 3:
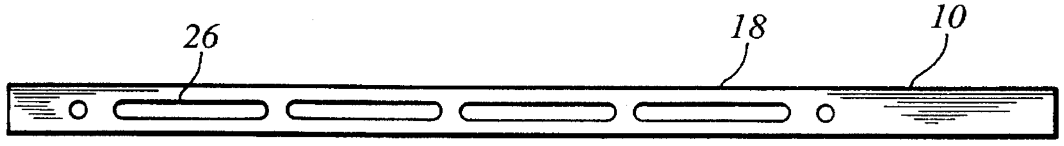
FIG. 3 is a plan view of the device of FIG. 2.
Figure 4:
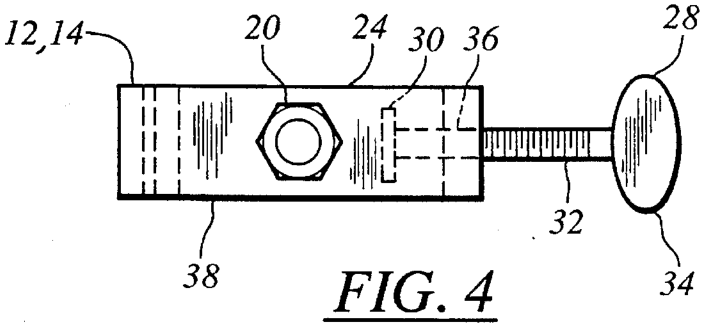
FIG. 4 is a plan view of "C" clamp bracket assembly in accordance with the present invention.

Referring now to FIGS. 2–4, device 10 is comprised of a long, rectangular structural member 18 preferably square in cross-section with a multiplicity of slots or holes 26 to attach the two preferably "C" clamp bracket assemblies 12, 14 slidable along the length of structural member 18 so that bracket assemblies 12, 14 can engage the gunwales of any width boat. Of course, the cross-section of structural member 18 may be of any other suitable cross-section such as U-shaped, rectangular, oval or round. These alternative cross-sections may either be solid or tubular (hollow) so long as sufficient rigidity is provided as will be discussed hereinafter with regard to FIGS. 7A–I. A fishing rod clamp 19 is mounted on the first (or second) end of structural member 18.

Structural member 18 is preferably made of aluminum material suitably finished in a known manner. Structural member 18 is preferably 2–5 feet in length and preferably has a multiplicity of adjustment slots 26 that are 2 inches long and 0.390 inches wide at about 1½" distance from one end of structural member 18. Provision is provided to clamp a fishing rod holder universally on the structural member 18 for trolling purposes. The electric trolling motor mount 10 extends approximately ½ feet beyond one of the gunwale of the boat to provide sufficient room for the mounting of the electric trolling motor without interfering with the clamping of a fishing rod holder anywhere on the electric trolling mount 10 at which the electric trolling motor is fastened.

The "C" clamp bracket assemblies 12, 14 are each comprised of a "C" clamp structural member 24, structural attachment bolt or stud 20, and adjustable thumb screw fastener assembly clamp 28. "C" clamp bracket assemblies 12, 14 are preferably identical. Adjustable thumb screw fastener assembly 28 is preferably comprised of three elements, a swiveling pad 30, a threaded stud 32, and a thumb nut 34. Pad 30 is preferably made of aluminum material and is attached to threaded stud 32 in a known manner whereby pad 30 may be in a non-rotating condition while threaded stud 32 can still rotate while being rotated by the action of thumb nut 34 to assure a tight fit against the gunwale of a boat.

"C" clamp structural member 24 is preferably made of aluminum material finished in a known manner and preferably has the dimensions 1½" wide, 3" long and has a 2" thickness. Near the end of one of the "C" legs is a threaded hole 36, preferably ⅜ diameter and 16 thread. This female threaded hole 36 is for engagements of the adjustable thumb screw fastener assembly clamp 28. Threaded stud 32 is preferably made of aluminum material and ⅜ diameter 16 thread ×2¼ length.

Structural attachment bolt or stud 20 is threaded or otherwise fixed (welded or other like means) to the midpoint of the back 38 of "C" clamp structural member 24.

Figure 5:
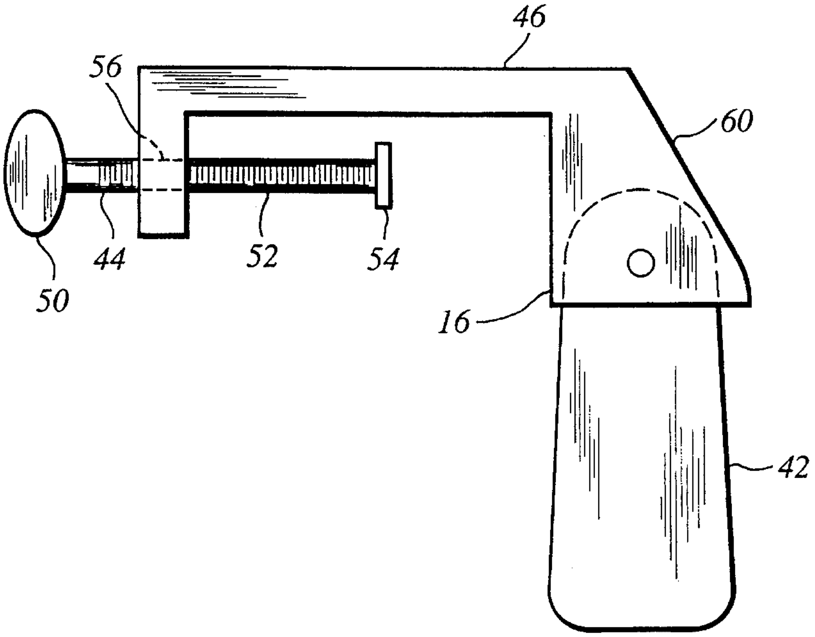
FIG. 5 is a side elevation view of the optional fixed rudder in accordance with the present invention.
Figure 6:
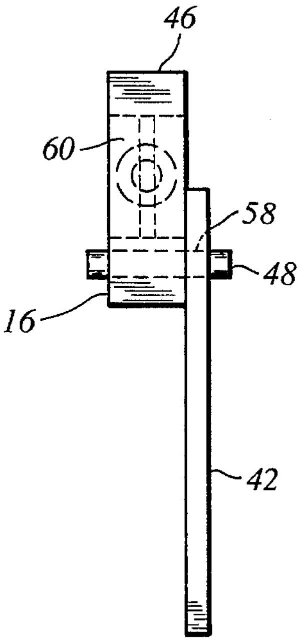
FIG. 6 is an end elevation view of the device of FIG. 5.

Turning now to FIGS. 5 and 6, a discussion of the optional fixed rudder 16 follows. The fixed rudder 16 is comprised of a bracket assembly generally shown at 40 and a fixed rudder element 42. This fixed rudder 16 is required to keep the boat stable when there is no other propulsion source except for the electric trolling motor. Bracket assembly 40 is comprised of a thumb screw assembly 44, bracket frame 46 and rudder swing pin 48.

Thumb screw assembly 44 is comprised of thumb tightening element 50, threaded stud 52 and swivel pad 54. Tightening element 50 is solidly fastened to threaded stud 52 (i.e., welding, casting or other suitable known means) and is preferably made of aluminum material. Pad 54 is attached:to threaded stud 52 in a known manner whereby pad 54 may be in a non-rotating condition while threaded stud 52 can still rotate while being rotated by the action of thumb tightening element 50 to assure a tight fit against the transom or a foot wall of the boat.

Bracket frame 46 is a substantially "C" shaped cast or machined element which, near the end of one of the legs of the "C", has a female threaded hole 56 sized to receive threaded stud 52. The second leg 60 of the "C" flares out to match up with the narrower end of fixed rudder element 42. Fixed rudder element 42 is a substantially rectangular shape with dimensions that are preferably 2–5" wide, approximately 27" long and ½" thickness. Near the end of the narrower portion of fixed rudder element 42 is a hole 58 sized to receive rudder swing pin 48 so that rudder swing pin 48 will turn only upon a preset load. Near the end of second leg 60 of the "C" is, again, a hole 62 identically sized to hole 58 so that rudder swing pin 48 will turn only upon a preset load. This is to protect fixed rudder element 42 should it strike an object below the bottom of the hull of the boat.

Figure 7A:
Figure 7B:
Figure 7C:
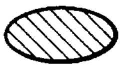
Figure 7D:
Figure 7E:
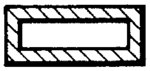
Figure 7F:
Figure 7G:
Figure 7H:
Figure 7I:
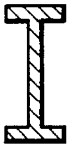

FIGS. 7*a*–7*i* depict alternate cross-section embodiments of structural member 18. FIG. 7*a* depicts a solid rectangular cross-section. FIG. 7*b* depicts a solid round cross-section. FIG. 7*c* depicts a solid oval cross-section. FIG. 7*d* depicts a square tubular cross-section. FIG. 7*e* depicts a rectangular tubular cross-section. FIG. 7*f* depicts a round tubular cross-section. FIG. 7*g* depicts an oval tubular cross-section. FIG. 7*h* depicts a U-shaped solid cross-section. Finally, FIG. 7*i* depicts an "T" beam shaped solid cross-section.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A motor mount comprising:

structural support means having opposed first and second ends;

first bracket assembly means attached to said structural support means near said first end thereof, said first bracket assembly means for removable attachment to a first gunwale of a boat;

second bracket assembly means attached to said structural support means near said second end thereof, said second bracket assembly means for removable attachment to a second gunwale of a boat; and said structural support means having a mounting surface extending outwardly of said first or second bracket assembly means to support an outboard motor adjacent a first or second gunwale of a boat.

2. The device of claim 1 wherein said structural support means has a plurality of slots and wherein said first and second bracket assemblies are mounted to said structural support means through said slots.

3. The device of claim 1 wherein each of said first and second bracket assembly means are comprised of an essentially "U"-shaped bracket having a bottom and two extending sides with bolt fastening means located about midway on the bottom of the "U"-shaped bracket to provide means to movably attach said "U"-shaped bracket to said structural support.

4. The device of claim 3 wherein said "U"-shaped bracket includes thumbscrew assembly means to affix said "U"-shaped bracket assembly to the gunwales of a boat.

5. The device of claim 1 wherein said structural support means is comprised of aluminum material.

6. The device of claim 1 wherein said structural support means has a cross-section selected from the group consisting of:

a solid square cross-section, a solid circular cross-section, a solid oval cross-section, a square tubular cross-section, a rectangular tubular cross-section, a round tubular cross-section, an oval tubular cross-section, a solid "U"-shaped cross-section, and a solid 'T'-shaped cross-section.

7. A motor mount and boat comprising:

(1) a boat having first and second opposed gunwales;

(2) a motor mount mounted across said first and second gunwales, said motor mount comprising, (a) structural support means having opposed first and second ends;

(b) first bracket assembly means attached to said structural support means near said first end thereof, said first bracket assembly means removably attached to said first gunwale of said boat;

(c) second bracket assembly means attached to said structural support means near said second end thereof, said second bracket assembly means removably attached to said second gunwale of said boat; and (d) said structural support means having a mounting surface outwardly of said first or second bracket assembly means to support an outboard motor adjacent said first or second gunwale of said boat.

8. The device of claim 7 wherein the said structural support means has a plurality of slots and wherein the said first and second bracket assembly is mountable to said structural support means through said slots.

9. The motor mount arid boat of claim 7 including:

a motor mounted on said mounting surface of said motor mount.

10. The device of claim 9 wherein:

said motor comprises an electric motor.

11. The device of claim 7 including:

a fixed rudder assembly mounted on said boat to provide stability when said boat is being pulled by a motor mounted on said motor mount.

12. The device of claim 11 wherein the said rudder assembly means includes torsional pivot means when said rudder strikes an object below the hull of the boat so it may swing up and out of the way of said object to prevent said rudder from deforming or breaking.

13. The device of claim 7 wherein said boat has seats and wherein:

said motor mount is mounted in front of the most forward of said seats.

14. The device of claim 7 wherein:

said boat is selected from the group consisting of Jon-boat, V-hull boat and canoe.

15. The device of claim 7 including:

a fishing rod clamp on the first or second end of said structural support means opposite to said mounting surface.

16. A motor mount comprising:

structural support means having opposed first and second ends;

first bracket assembly means attached near said first end of said structural support means so as to affix said structural support means to a first gunwale of a boat;

second bracket assembly means attached near said second end of said structural support means so as to affix said structural support means to a second gunwale of boat;

said structural support means having a mounting surface extending outwardly of said first or second bracket assembly means to support an outboard motor adjacent the first or said gunwale of a boat; and said structural support means having a plurality of slots and with said first and second bracket assemblies mounted to said structural support means through said slots.

17. The device of claim 16 wherein said structural support means is comprised of aluminum material.

18. The device of claim 16 wherein said structural support means has a cross-section selected from the group consisting of:

a solid square cross-section, a solid circular cross-section, a solid oval cross-section, a square tubular cross-section, a rectangular tubular cross-section, a round tubular cross-section, an oval tubular cross-section, a solid "U" shaped cross-section, and a solid "I"-shaped cross section.

19. A motor mount and boat comprising:

(1) a boat having first and second opposed gunwales; and (2) a motor mount mounted across said first and second gunwales, said motor mount comprising, (a) structural support means having opposed first and second ends, (b) first bracket assembly means attached near said first end of said structural support means so as to affix said structural support means to said first gunwale of said boat, (c) second bracket assembly means attached near said second end of said structural support means so as to affix said structural support means to said second gunwale of said boat, and (d) said structural support means having a mounting surface outwardly of said first or second bracket assembly means to support an outboard motor adjacent said first or second gunwale of said boat; and (3) a fixed rudder assembly mounted on said boat to provide stability when said boat is being pulled by a motor mounted on said motor mount.

20. The device of claim 19 wherein the said structural support means has a plurality of slots and wherein the said first and second bracket assemblies are mounted to said structural support means through said slots.

21. The motor mount and boat of claim 19 including:

a motor mounted on said mounting surface of said motor mount.

22. The device of claim 21 wherein:

said motor comprises an electric motor.

23. The device of claim 19 wherein the said rudder assembly means includes torsional pivot means when said rudder strikes an object below the hull of the boat so it may swing up and out of the way of said object to prevent said rudder from deforming or breaking.

24. The device of claim 19 wherein said boat has seats and wherein:

said motor mount is mounted in front of the most forward of said seats.

25. The device of claim 19 wherein:

said boat is selected from the group consisting of Jon-boat, V-hull boat and canoe.

26. The device of claim 19 including:

a fishing rod clamp on the first or second end of said structural support means opposite to said mounting surface.

* * * * *